United States Patent
Nath

[11] 3,843,865
[45] Oct. 22, 1974

[54] DEVICE FOR MATERIAL WORKING BY A LASER BEAM, AND METHOD FOR ITS PRODUCTION

[76] Inventor: Günther Nath, Speyerstr. 21, Munich, Germany

[22] Filed: Sept. 13, 1972

[21] Appl. No.: 288,726

[30] Foreign Application Priority Data
Sept. 14, 1971 Germany............................ 2145921

[52] U.S. Cl.............. 219/121 L, 128/395, 350/96 R
[51] Int. Cl......................... B23k 27/00, G02b 5/14
[58] Field of Search................ 219/121 L; 250/227; 128/303.1, 395–398; 331/94.5 A; 350/96 R, 96 B

[56] References Cited
UNITED STATES PATENTS

| | | | |
|---|---|---|---|
| 1,968,997 | 8/1934 | Prucker | 219/121 L |
| 3,068,739 | 12/1962 | Hicks, Jr. et al. | 128/395 |
| 3,304,403 | 2/1967 | Harper | 201/121 L |
| 3,315,680 | 4/1967 | Silbertrust et al. | 219/121 L |
| 3,382,343 | 5/1968 | Muncheryan | 219/121 L |
| 3,610,755 | 10/1971 | Wieberger et al. | 350/96 WG |
| 3,621,198 | 11/1971 | Herbrich | 219/121 L |
| 3,710,798 | 1/1973 | Bredemeier | 219/121 L |

FOREIGN PATENTS OR APPLICATIONS

| | | | |
|---|---|---|---|
| 1,922,924 | 12/1970 | Germany | 350/96 B |

OTHER PUBLICATIONS

IBM Technical Disclosure Bulletin, "Polishing of Light Fibers and Forming Ends" Vol. 9, No. 11 4/67, pp. 1582.

Primary Examiner—C. L. Albritton
Assistant Examiner—Clifford C. Shaw
Attorney, Agent, or Firm—Wood, Herron & Evans

[57] ABSTRACT

A device for material working by a laser beam wherein an unclad, optically and materially homogeneous quartz rod having enlarged ends tapered to a fiberlike center portion is protectively enclosed in a flexible tube. Preferably, the tube is provided with annular spacer rings of quartz glass to keep the fiber from contacting the tube wall. To provide high power and high efficiency transmission, the tube is filled with a circulating liquid having a refractive index less than that of the fiber, and the spacers are coated with substance having a refractive index which is the same as that of the liquid. The fiber is made by heating a rotating quartz rod and drawing it. The rotation is controllably slowed and stopped to prevent twisting as the rod softens. Alternatively, a quartz rod is etched to the desired form.

28 Claims, 7 Drawing Figures

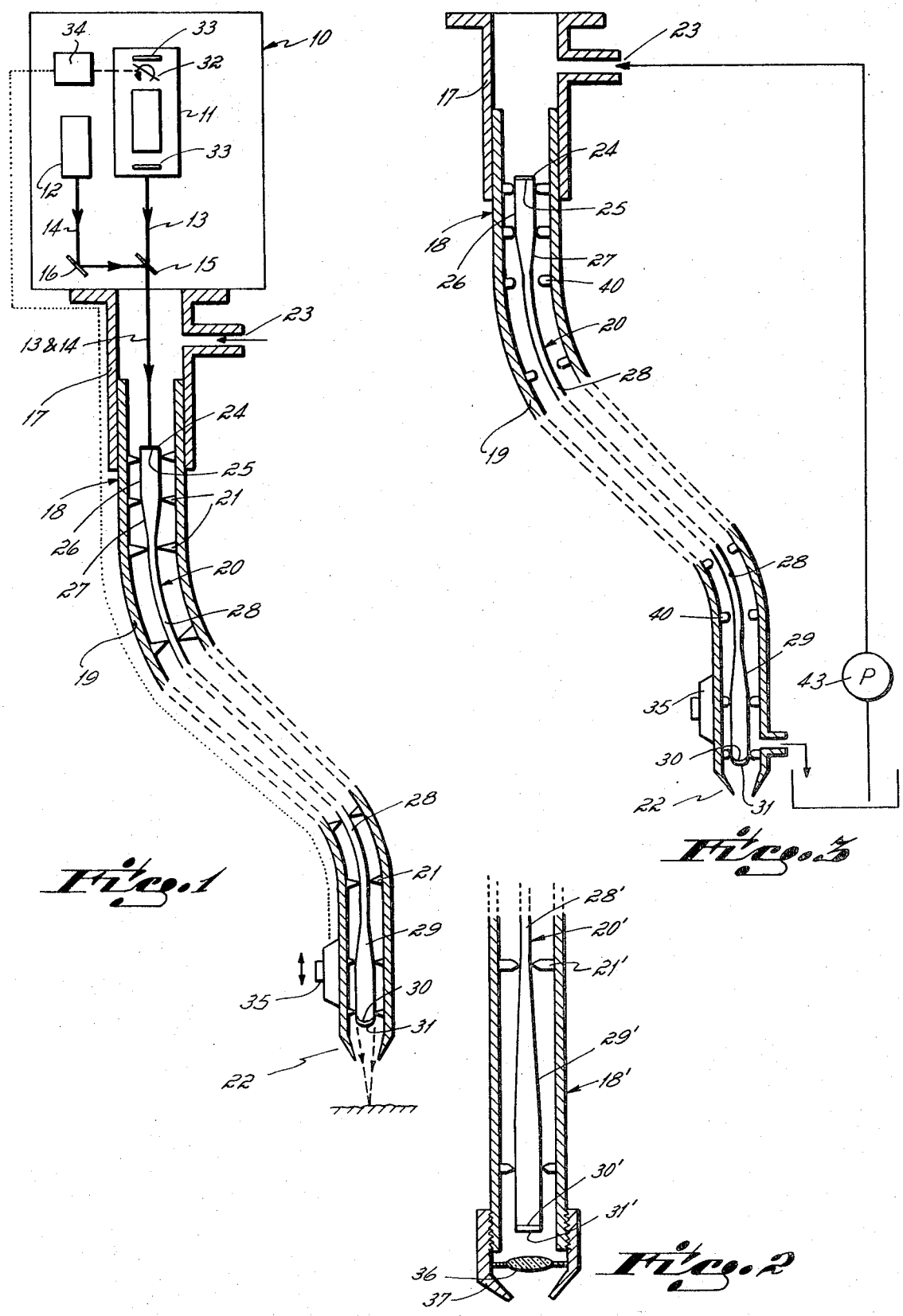

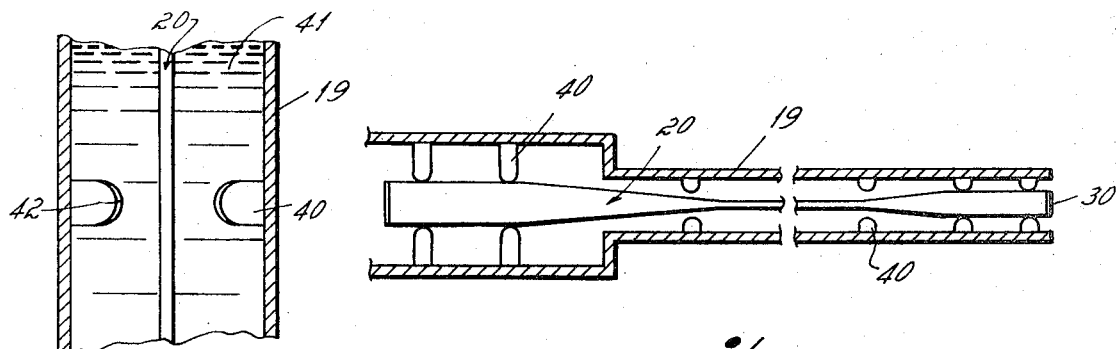
Fig.4
Fig.5
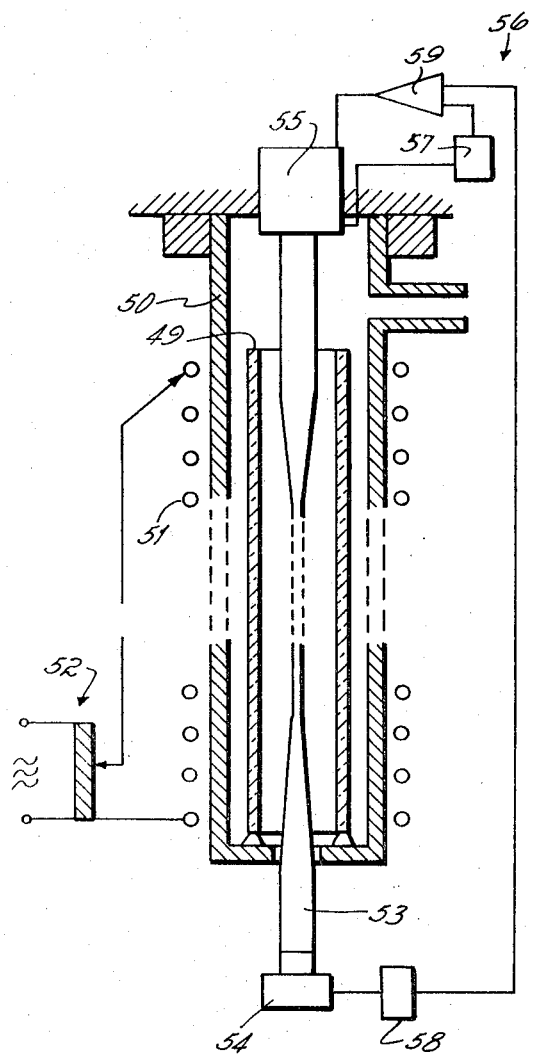
Fig.6
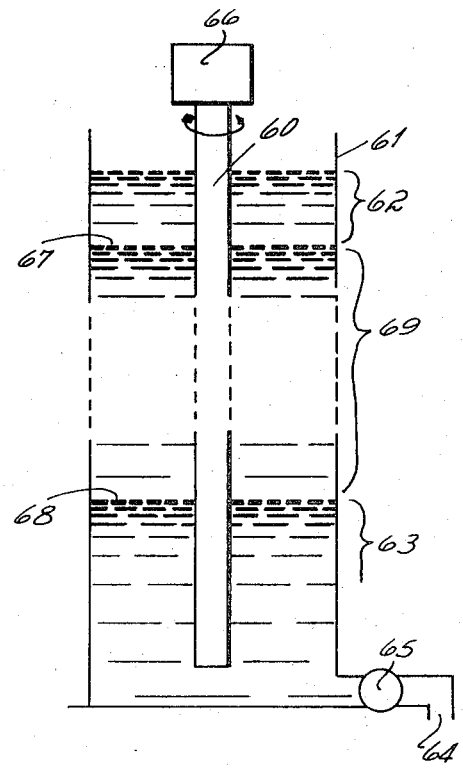
Fig.7

DEVICE FOR MATERIAL WORKING BY A LASER BEAM, AND METHOD FOR ITS PRODUCTION

This invention relates to a device for material working by a laser beam using a laser and a flexible fiber. In addition, the invention includes also a method and apparatus ducing a fiber for use in such a device.

Devices for material working, for example, drilling holes, cutting and so on, by a laser beam are already known. These devices usually work in such a way that the material being worked on is moved past a stationary laser beam. Such devices, while very useful in some technical applications such as resistor trimming, cannot be used when the laser beam must be manipulated by hand such as in medical applications and special cases of microwelding. For such purposes it is already known to use a fixed laser with a flexible fiber bundle attached so it can be moved at its free end by hand. The known devices of this type, however, have substantial disadvantages. For example, the transmission of high laser power, as it is being used in material processing, in combination with a low output divergence is not possible. Glass fiber bundles, consisting of a bundle of thin, optically isolated glass fibers, become damaged by high laser powers. The same happens to the so called Selfoc fibers where the optical isolation is done by a parabolic change of the refractive index along the diameter of the fiber. (See "Laser und Angewandte Strahlen Technik," Nr 2/1971, p. 29–47). The usual diameter of such Selfoc fibers and rods is in the order of 0.2 – 0.5 mm. Also tapered Selfoc rods are known having, for example, a length of 17 mm and a diameter of 0.2 mm on one end and 1 mm on the other end. Such glass fibers and rods are produced by exchanging the ions of an originally homogeneous fiber in a salt melt. Due to their high core refractive index of about 1.6 and their sinusoidal light porpagation characteristics, periodic points of high power density is developed inside the fiber, making these fibers less resistant to higher laser powers.

As to flexible light pipes for high power laser radiation, only a system of mirrors has been used so far in practice. These mirrors are positioned in form of an articulated arm. Such light pipes are big and bulky and allow only for a limited flexibility, so that they cannot be used for many applications.

Finally, flexible light pipes with a polished gold layer applied onto their inner surface are also known. Such light pipes have also only a limited flexibility, and in addition, the metallic reflective layer is rather sensitive to high intensity radiation of the type emitted by pulsed lasers with high peak power.

Besides being sensitive to high intensive laser radiation, the known light pipes have the major disadvantage of increasing the angular divergence of the transmitted radiation substantially, and their transmission characteristics is not high enough, especially when high transmission within a large spectral range is demanded. The above mentioned Selfoc fibers and rods, for example, are not transmitive in the ultraviolet.

It is a primary objective of the present invention to provide a device for material by processing by a laser beam, which can transmit very high laser intensity, without the risk of damage to the device, which device can be easily manipulated by hand, and which device has a high efficiency because its radiation losses are low and the increase of angular divergence of the laser beam is so small that it can be focused to a very small spot size.

Accordingly, the present invention is predicated in part upon the concept of providing a device as mentioned above, but with the light fiber made from an homogeneous quartz rod, having a diameter of at least, for example, 3 mm at the entrance end, corresponding to the diameter of the laser beams, and that this quartz rod decreases its diameter continuously to a fiber like part having at least 400 mm of length and a diameter between 0.1 and 0.4 mm, and then increases its diameter again, ending in a light exit face. The rod is positioned in a flexible tubing to protect it from breaking and is surrounded by distance holders or spacers to prevent it from touching the protective outer tube. The use of a quartz rod which is extremely homogeneous from the point of view of its material and its optical properties, and having the above given form, allows for the transmission of very high powers of radiation with little losses and only small increases of the angular divergence, without danger of damage of the quartz rod. Because of its relatively large entrance and exit faces (which are preferably anti-reflection coated), the power density is small at the two boundaries of different optical media where damage is most likely to occur. In addition, while a gradual taper is maintained at the entrance end of the fiber, the taper of the exit end, in one embodiment, is more abrupt, thus, approximating a point source as the energy departs from the surface of the fiber, to better enable the focusing of the exiting beam with a single lens.

The present invention is further predicated in part upon the concept of providing a high efficiency laser transmission fiber which is protectively encased in a flexible tubing, the fiber being of unclad, homogeneous quartz, and the combination being provided with means for reducing or eliminating altogether the likelihood of the surface of the fiber coming into contact with the tubing wall or other structure or substance which, having a different index of refraction from that of the medium surrounding the rod would cause escape of laser energy at the discontinuity which would reduce transmission efficiency and cause damage to the fiber or the protective structure.

Specifically, the present invention provides a protective, flexible metal tubing lined with a Teflon flexible sleeve surrounding the quartz fiber. Spaced along the sleeve are spacer rings which, if the tube is bent will contact the fiber to keep it out of contact with the tubing wall. For higher power applications, the spacer rings are made from fire-polished glass. The tube is filled with a liquid substance such as propanol. The liquid is selected to have an index of refraction of, for example, 1.38 or slightly less than that of the quartz fiber which is typically 1.46. The inner surfaces of the spacer rings are coated by vacuum deposition with a salt such as magnesium fluoride which is selected to have an index of refraction identical to that of the liquid of 1.38, for example. Thus, the quartz fiber, even when in contact with one of the spacer rings, will not encounter a discontinuity of the index of refraction of the surrounding media and, thus, loss of power caused by such discontinuities is reduced to an insignificant level. For higher power applications, the liquid is continually recirculated by a pump through the tube to an external cooling media or larger reservoir of cool fluid.

Another aspect of the present invention is predicated in one embodiment upon the concept of providing a method for the production of a device according to the invention from a quartz rod suspended inside of a heatable rotating tube. A weight is attached at the free end of the rod, and the tube is heated to a temperature such that the middle part of the quartz rod will soften and stretch under the influence of the weight to become elongated to a fiberlike part having a diameter varying from 0.1 to 0.4 mm.

In an alternative embodiment, the device is produced which delivers especially homogeneous light pipes by suspending a quartz rod vertically inside of a liquid that dissolves glass, for example, hydrofluoric acid. The rod is rotated in this liquid, and a movement vertical to the axis of the quartz rod is provided between at least one of the boundaries of this liquid and the quartz rod.

A third and preferred embodiment of the method is similar to the first mentioned method except that the fiber is rotated in the heatable tube. This overcomes problems of non-symmetry in the heating of the tube or placement of the rod within the tube. Before the fiber softens, the rotation is stopped so that tortional deformation of the fiber will not occur. Alternatively, the rotation may be maintained as the fiber softens, but the motor rotating the rod is slowed in a controlled manner in accordance with slowing of the weight due to loss of rotational energy.

The advantages of the present invention reside in the provisioning of highly effective fiber isolation and shielding. The isolation of the fiber, particularly in that embodiment wherein the liquid medium and spacers have matched indices of refraction, provide highly effective isolation particularly useful with high powers. This embodiment provides even greater isolation than in the one embodiment described herein wherein spacers alone are used. With only spacers, when exceptionally high powers are use, the power losses at the points of contact with the spacers can be damaging to the apparatus. However, with the coated spacers having indices of refraction matching that of a liquid medium, high powers of from 30 to 200 watts have been successfully employed. Additionally, laser pulses of 25 joules and $F$ millisecond duration have been transmitted along a fiber of 140 mm in length with 80 percent transmission efficiency. The same structure is effective for powers at below 30 watts, and in these applications it is not necessary to circulate the liquid. Additionally, at such powers, the coating of the spacers may be eliminated unless particularly high transmission efficiency is desired. At lower powers, the liquid may be completely eliminated. However, the primary advantages of the present invention reside in its ability to handle high power laser applications with great efficiency and safety.

These and other objectives and advantages of the present invention will be more readily apparent from the following detailed description of the drawings illustrating a device for working a material with a laser beam and a method of production of the device embodying the principals of the present invention.

FIG. 1 shown a laser device embodying principals of the present invention.

FIG. 2 shows a different form of a part of FIG. 1.

FIG. 3 illustrates an embodiment of the device of FIG. 1 preferred for high power applications.

FIG. 4 is an enlarged view of a portion of FIG. 3 illustrating particularly the space to assembly.

FIG. 5 is an alternative embodiment of the device of FIG. 4.

FIG. 6 shows a schematic view of an apparatus according to the invention for the production of a light guide rod for a device according to the invention in accordance with the method of the present invention.

FIG. 7 shows a schematic view of another apparatus and method for the production of a light guide rod according to the invention.

Referring to FIG. 1, an instrument for cutting that works with a sharply focused laser beam and can be used in industry for material working or in medicine for cutting of tissue and coagulation is shown. The device contains a radiation source unit 10, which may be suspended vertically in a manner not shown here (at the ceiling of a laboratory or operating room) and a high power laser 11 as well as a light guide laser 12. The high power laser 11 may be, for example, a continuously working YAG:Nd laser that delivers a beam 13 with a wavelength of 1 $\mu$ and which may have a CW power ranging from 30 to 200 watts. As the radiation is in the invisible infrared range, a visible beam 14 from the illumination laser 12 is brought into the axis of the infrared beam 13 by a partially transmitting mirror 15 and another mirror 16.

The illumination laser may be a He-Ne laser or preferably a Kr laser with low power of about 5mW. Of course, it is in principle possible to use a conventional light source for illumination. For the illumination in general, white light is to be preferred.

The combined beams 13 and 14 are emitted by the radiation source unit 10 into a tube 17, inside of which another tube 18 is positioned movable in a telescope like manner. Tube 18 is slidably mounted within tube 17 such that tube 18 can be pulled out quite a long distance of several feet from the laser source 10, and is biased by springs or other such means so that it is able to return in its retracted position.

A flexible tubing 19 is attached to tube 18, inside of which the light guide rod 20 is held by a plurality of spacers 21. The longer end of the flexible tubing 19 is formed into a kind of nozzle 22 that emits a stream of gas, which is introduced by an inlet 23 on tube 17, and which protects the exit face of the light guide rod 20, or the focusing optics, from being contaminated by evaporated particles.

The light guide rod 20 has an anti-reflection coated (24) entrance face 25, the diameter of which is preferably greater than 3 mm and may be, for example, 4 mm.

The light entrance face 25 is followed by a section of 26 with a constant diameter which is followed by a section 27. Within section 27 the quartz glass light guide rod decreases its diameter continuously to a thin fiberlike section 28. Section 27 has a length that is preferably 50 to 100 times as long as the diameter of the light entrance face. With a given diameter of the light entrance face of 4 mm, the length of section 27 may be 20 to 40 cm.

The length of the fiberlike section 28 is preferably at least 400 mm, its diameter may vary between 0.1 and 0.4 mm, and is preferably 0.3 mm.

At the end of the fiberlike section 28, which is more distant from the radiation source unit 10, the light guide rod increases its diameter again continuously within a section 29, ending at a light emitting surface 30, with anti-reflection coating 31, that is formed as a lens surface in the illustrated embodiment.

The light guide rod 20 consists of homogeneous quartz glass of the highest optical quality. In its whole cross section, it is as homogeneous as possible with the state of the art both in its material and optical properties. The light guide rod is optically isolated by knife edge like spacers 21, which may consist of, for example, magnesium fluoride crystals, and which are formed in the illustrated embodiment in such a way that gas can be circulated through tube 18.

In order to be able to control or to interrupt the intensity of the radiation bundle 13, laser 11 is provided with an intensity control. The intensity control includes a thin anti-reflection coated plate 32, positioned inside of the optical resonator of laser 11, between the resonator mirrors 33. The plate 32 can be rotated on an axis perpendicular to the beam 13 by a device 34 controlled by an actuator 35. By rotating plate 32, the intensity of the beam admitted by the high power laser 11, can be varied, and additional devices may be provided for shutting down the laser beam (if this is not possible with the plate 32 alone).

FIG. 2 shows the light exit end of the flexible light pipe, in a device somewhat varied compared to the device of FIG. 1. The light guide rod 20' has a plane light exit face 30' which is also anti-reflection coated. Focusing of the fairly parallel light beam emitted by the light exit face 30' is done by a focusing optic 36, which may be fixed inside a short tube 37, screwed onto the front end of tube 18', and can also have the form of a nozzle.

When the device is used for some medical purposes, the focusing optics 36 are preferably removable so that the surgeon is able to change quickly between a focused beam for cutting and a non-focused beam for coagulation. The light guide rod 20', as shown in FIG. 2, delivers an emitting light beam with especially small angular divergence. In a practical example, the light guide rod has a length of 120 cm, with an entrance and exit face diameter of 4 mm, and a diameter of the fiberlike middle part of about 0.3 mm. The transmission efficiency of the rod is more than 90 percent using a He-Ne laser with the 1 milliradian divergence, and the exit beam divergence is only 1.2° (full angle of light cone). The low exit beam divergence is extremely important for the generation of small focal point using focusing optics. In contrast, a fiber bundle, having the same length and a diameter of 5 mm, showed a transmission of only 48 percent and the divergence of the exit light cone was 17°. In addition, the glass fiber light guide does not resist higher powers of radiation. The light guide, according to the invention, can transmit 200 watts CW of a YAG:Nd laser or pulsed energies of a ruby laser up to several joules, without being damaged.

The length of the part with an increasing diameter can be equal to the length of the part with a decreasing diameter or be much shorter, for example, 100 mm, than the part with decreasing diameter 27 (FIG. 1).

In FIGS. 3–5, the preferred form of the present invention is shown in two embodiments.

Referring to FIG. 3, a division most suitable for high efficiency and/or high power transmission is shown. This device is essentially the same as the device of FIG. 1 with the following exceptions or additions.

In FIG. 3, the spacers are rings 40 made of quartz glass and are illustrated better in FIG. 4.

The inner diameter is preferably about 0.2 mm at least larger than the diameter of the light guide rod at its rigid part 25. The spacers are cut with a diamond saw from a quartz glass tubing. The sharp edges are then fire polished with a flame so they can be stacked into a flexible Teflon tubing (19) about 10–20 mm distant from each other. The thickness of the spacers is about 2 mm. Quartz glass is chosen for the spacers because it is the only dielectric transparent and laser stable substance, with a refractive index of the material. The light pipe is made of, namely, also quartz glass, and from which rings can be made easily of the above given form.

The spacers prevent the light guide filament 28 from touching the flexible tube 19. In the cases where powers of greater than 20 watts are transmitted, the fiber would burn out where it comes into contact with the tube wall.

The spacers can be used in connection with an immersion liquid 41 which has a refractive index a little lower than that of quartz glass ($n$ quartz glass $= 1.46$), as, for example, propanol with an index of refraction of about 1.38. The combination of the spacers of this liquid allow for minimum losses at each point where the filament touches one of the spacers.

In order to reduce these small losses at each contact point (filament-spacer) even more, the spacers can be provided with a dielectric layer 42 on their inner surface. The dielectric layer, which is vacuum deposited, should have a refractive index equal to that of the immersion liquid. For this case, the quartz filament is optically isolated throughout its length by a medium with homogeneous optical density, even at points where the filament touches the spaces. This homogeneous isolation is especially important because losses of radiation at the spacer contact points heat up the whole light pipe. $CaF_2$ ($n = 1.42$) and $MgF_2$ ($n = 1.38$) are suitable substances for the vacuum deposition on the spacers.

For high powers in the range from 30 watts to 200 watts, the immersion fluid should be circulated through the flexible tube 19 by a small pump 43 in a closed pumping system. This will prevent the light pipe from getting hot.

The embodiment of FIG. 5 is especially suitable for internal surgery. The outer tube 19 is of reduced diameter while the exit end of the fiber 30 is also smaller, for example, 1 mm or less. The spacers are also smaller, being still of an inside diameter of about 0.2 mm greater than the exit face of the fiber.

For the production of a light guide rod consisting of quartz glass for a device according to one aspect of the invention, an apparatus can be used as shown schematically in FIG. 6. The apparatus contains a tube of graphite 49 and an outer tube 50, which are surrounded by a high frequency coil 51, which is connected to a high frequency generator (not shown) by a power regulation coil 52.

A rod of quartz glass 53 can be suspended inside the tubes 49 and 50.

The production of a light guide rod according to FIGS. 1, 2, 3 or 5 is done in the following way: At first the graphite tube is heated to a temperature necessary to pull the quartz glass fiber. Then, the quartz glass rod, the end faces of which have already been optically finished, is suspended inside the graphite tube, and a small weight 54 is attached at the lower end of the quartz glass rod. The temperature of the graphite tube must be so high that the quartz glass rod is heated very rapidly, in order to prevent recrystallization. Preferably the temperature is so high that the light guide rod, as shown, for example, in FIG. 1 (diameter of the light entrance and exit face 4 mm, diameter of the fiberlike part 28 about 0.3 mm) provided with a weight of about 150 grams can be pulled to a length of about 600 to 1,500 mm within 2 minutes. With this method of production, the fiberlike part has not a constant diameter, the diameter is rather decreasing up to a certain point near part 29, and beyond this point, the diameter increases again.

The geometry of the cones of the quartz rod can be influenced in a definite way by variation of the heat power, the geometry of the oven and the weight.

After it has been pulled, the light guide rod is packaged into the flexible tubing 19 (FIG. 1). The preferred method of production of the light guide rod can be understood. In this method, the rod is caused to rotate within the graphite tube by a motor 55. In this way, irregular heating about the circumference of the rod due to lack of perfect placing of the rod in the center of the graphite tube is avoided. It is also desirable to rotate the graphite tube 49 either at a different speed or preferably in the opposite direction of the rod rotation. When the rod is rotated, it is desirable to stop its rotation before the rod has softened. This prevents torsional strain on the rod. Also, it is possible to rotate the rod after it has softened provided that the drive from the motor 55 is slowed at a rate equal to the natural slowing of the weight 54. This may be achieved by a feedback control 56 provided by a motor speed sensor 57, a speed sensor 58 at the weight 54, and a servo control 59 for driving the motor 55.

With the above described thermal procedure for the production of the light guide rod, optical inhomogeneities may occur in the form of fluctuations of the refractive indices, which increase the divergence of the transmitted light and also decrease the transmission efficiency. These inhomogeneities are difficult to eliminate. However, they can be avoided to a considerable degree by a chemical method of production explained in more detail in connection with FIG. 7.

The chemical method of production starts with a quartz glass rod of the highest optical quality, the length of which corresponds to the desired length of the light guide rod. The thickness of the rod corresponds to the diameter of the light entrance face or light exit face respectively. Such quartz glass rods with a diameter of 5 to 7 mm are commercially available.

According to FIG. 7, a quartz glass rod 60 with the highest optical quality, having a length of about 1,000 mm and a thickness of about 5 mm is suspended in a cylindrical container 61 of plexiglass with 1,500 mm length in such a way that the rod may also rotate. The cylinder 61 contains a solution 69 of HF with a concentration of about 20 percent. Above and beneath this solution there are other liquids 62 and 63 which are not soluble in HF and which do not chemically react with the plexiglass. The densities of the liquids 62 and 63 are closer such that the desired layer formation as shown in FIG. 7 is possible.

The cylinder 61 has an outlet 64 with a clamp 65 at the bottom which allows for very slow and controlled outflow of the liquid.

The quartz glass rod 60 is rotated by a motor 66 with one rotation per second.

The diluted HF solution decreases the diameter of the rotating quartz glass rod 60 from 5 to 0.3 mm within a few weeks by etching. The outflow of the liquid and the slow sinking of the limit surfaces 67 and 68 provide for the tapered parts of the light guide rod, the length of which can be controlled by the outflow rate. Fluctuation of the concentration of the HF solution can be avoided by a little heater (not shown) inside of the solution. The heater generates a convection inside of the solution.

The liquid 62, which may be parafine oil, protects the HF solution from evaporation.

The surface of the light guide rod produced by etching in the above described manner can be mechanically or chemically polished, i.e., by continuously decreasing the concentration of the HF solution or by using other etching compounds than HF, which makes a smoother etching structure, like, for example, ammonium hydrogen fluoride.

Instead of having the liquid flowing out from the cylinder 61, it is, of course, also possible to translate the quartz rod slowly in direction of the axis, or by lowering the cylinder. When a light guide rod is being produced which has only one thick end, (i.e., a light guide rod with relatively small light exit face), the lower liquid 63 can be omitted.

Before the light guide rod is suspended in the etching solution and before its filament is polished, the end faces are polished and anti-reflection coated. The light guide rod is mounted inside the flexible tubing 19 (FIG. 1).

The flexiblity of tube 19 is limited insofar as to prevent the light guide rod 10 from being broken. At a filament thickness of 0.3 mm, a minimum radius of curvature of about 3 cm can be tolerated without risking fracture.

I claim:
1. A device for material processing by a laser beam of the type having a flexible light guide for directing the laser beam, said device comprising:
   a single homogeneous unclad quartz rod having
   1. a beam entrance face positioned to intersect the beam of light generated by a laser and having a diameter approximately equal to the diameter of the laser beam,
   2. a long, flexible fiberlike portion with a diameter substantially smaller than the diameter of said beam entrance face, and a length substantially larger than its diameter,
   3. a portion of continuously decreasing diameter extending from said entrance face to one end of said fiberlike portion,
   4. a beam exit face of greater diameter than the diameter of said fiberlike portion,
   5. a portion of continuously increasing diameter extending from the other end of said fiberlike portion to said beam exit face; a flexible tubing for protectably enclosing said quartz rod; and
   a plurality of spacers disposed within said tubing and positioned along the length of said quartz rod, each said spacers having an aperture through which said rod passes, each said spacer being coated with a material having an index of refraction less than said quartz rod, said spacers preventing contact of said rod with said tubing when said tubing is bent.

2. The device of claim 1 additionally including:
a fluid flowing through said tubing, said fluid having an index of refraction lower than the index of refraction of said rod, said fluid serving to cool the entire quartz rod and also to clad the rod so as to cause efficient transfer of light energy from said entrance face to said exit face.

3. The device of claim 1 wherein:
the diameter of said entrance face is at least 3 mm;

the diameter of said fiberlike part is between 0.1 and 0.4 mm; and
the length of said fiberlike part is at least 400 mm.

4. The device of claim 1 wherein the diameter of the light entrance face is between 3 and 10 mm.

5. The device of claim 1 wherein the length of said decreasing diameter portion is at least 50 times the diameter of said beam entrance face.

6. The device of claim 5 wherein the length of said decreasing diameter part is less than 100 times the diameter of said beam entrance face.

7. The device of claim 1 wherein the length of said part with increasing diameter is smaller than the length of said part with decreasing diameter, the preferred length being about 100 mm.

8. The device of claim 1 wherein said light exit face has the form of a lens.

9. The device of claim 1 further comprising a detachable focusing optic located at said light exit end of said light guide rod.

10. The device of claim 1 wherein one end of said flexible tubing is formed as a gas outlet nozzle, and the other end thereof is provided with a device for the introduction of a gas, and said flexible tubing forming a gas transmitting channel.

11. The device of claim 1 further comprising a visible light source and means to couple the beam from said visible light source into the path of the laser beam.

12. The device of claim 1 wherein the laser beam is generated by a laser including a front and a rear mirror, the space between said front and said rear mirror being the laser resonator, said device further including, a rotatable plate located inside the resonator of said laser and made from a laser light transparent material, and a means by which said plate can be rotated to control the power of the laser.

13. The device of claim 12 further comprising means located at the light exit end of said flexible tube for actuating said plate rotating means.

14. The device of claim 1 wherein said laser is mounted in a vertical position and said flexible tube is mounted on the lower end of the laser.

15. The device of claim 1 further comprising:
a liquid having an index of refraction less than that of said rod said liquid being contained within said tubing and surrounding said rod.

16. The device of claim 1 wherein the coating on said spacers has substantially the same index of refraction as that of said liquid.

17. The device of claim 16 wherein said spacers are coated with a vacuum deposit of a substance taken from the group consisting of calcium fluoride or magnesium fluoride.

18. The device of claim 1 further comprising means for recirculating said liquid through said tubing.

19. The device of claim 1 additionally including:
a fluid inside said tubing, said fluid having an index of refraction lower than the index of refraction of said rod, said fluid serving to cool the entire quartz rod and also to clad the rod so as to cause efficient transfer of light energy from said entrance face to said exit face.

20. In a device for material processing by a laser beam, which device includes a laser and a flexible light guide, the improvement wherein said light guide comprises:
a homogeneous uncoated and unclad quartz rod having
  a. a beam entrance face having a diameter in the order of the diameter of the laser beam,
  b. a long, fine flexible fiberlike part of a diameter substantially less than said diameter of the entrance face,
  c. a beam exit face of diameter greater than that of said fiberlike part,
  d. a portion of a continuously decreasing diameter extending from said entrance face to said fiberlike part,
  e. a portion of increasing diameter extending from said fiberlike part to said exit face, the length of this portion being smaller than said portion with decreasing diameter,
  f. a flexible tubing protectively enclosing said quartz rod,
  g. a liquid having an index of refraction less than that of said quartz rod being contained within said tubing and surrounding said rod; and
  h. a series of at least two ringlike spacers made from dielectric material, having an outer diameter apporximately equal to the inner diameter of said tubing, positioned inside said flexible tubing to maintain said light guide out of contact with the wall of said tubing, maintaining at least the portion with decreasing and increasing diameter out of contact with the wall of said tubing.

21. The device of claim 20 wherein the diameter of said fiberlike part is between 0.01 and 0.4 mm and the length of said fiberlike part is at least 400 mm.

22. The device of claim 20 wherein the diameter of the entrance and exit face is between 0.3 and 10 mm.

23. The device of claim 20 wherein the length of said decreasing diameter portion is at least 50 times the diameter of said beam entrance face.

24. The device of claim 20 wherein the length of said part with increasing diameter is smaller than the length of said part with decreasing diameter, the preferred length being about 100 mm.

25. The device of claim 20 wherein said light exit face has a spherical curvature.

26. The device of claim 20 wherein the rod contacting surfaces of said dielectric spacers are of the same index of refraction as that of said liquid.

27. The device of claim 26 wherein said ringlike spacers are made from glass and are coated with a vacuum deposit of a substance taken from the group consisting of calcium fluoride or magnesium fluoride.

28. The device of claim 20 further comprising means for recirculating said liquid through said tubing.

* * * * *